United States Patent
Kennedy

(10) Patent No.: US 9,360,122 B2
(45) Date of Patent: Jun. 7, 2016

(54) EXPANDING DISK GATE VALVE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 112 days.

(21) Appl. No.: 14/513,765

(22) Filed: Oct. 14, 2014

(65) Prior Publication Data

US 2016/0102767 A1    Apr. 14, 2016

(51) Int. Cl.
| | |
|---|---|
| F16K 31/00 | (2006.01) |
| F16K 25/00 | (2006.01) |
| F16K 3/00 | (2006.01) |
| F16K 3/02 | (2006.01) |
| F16K 3/18 | (2006.01) |

(52) U.S. Cl.
CPC ............ *F16K 3/029* (2013.01); *F16K 3/0227* (2013.01); *F16K 3/0254* (2013.01); *F16K 3/18* (2013.01)

(58) Field of Classification Search
CPC ..... F16K 3/029; F16K 3/0227; F16K 3/0254; F16K 3/18
USPC ......... 251/297, 195, 197, 326, 329, 199, 200, 251/202, 203, 204
See application file for complete search history.

(56) References Cited

U.S. PATENT DOCUMENTS

| | | | | |
|---|---|---|---|---|
| 3,457,950 | A * | 7/1969 | Over | F16K 3/28 137/546 |
| 4,165,063 | A * | 8/1979 | Qasim | F16K 3/186 251/168 |
| 4,408,634 | A * | 10/1983 | Peacock | F16K 3/184 137/630.12 |
| 4,483,514 | A | 11/1984 | Kennedy | |
| 4,640,302 | A * | 2/1987 | Impey | F16K 3/0272 137/15.18 |
| 4,913,400 | A | 4/1990 | Tiefenthaler | |
| 5,971,358 | A * | 10/1999 | Kennedy | F16K 3/18 251/197 |
| 6,254,060 | B1 | 7/2001 | Kennedy | |

* cited by examiner

Primary Examiner — John K Fristoe, Jr.
Assistant Examiner — Kelsey Rohman
(74) Attorney, Agent, or Firm — Brown & Michaels, PC

(57) ABSTRACT

An expanding disk gate valve assembly comprises two gate disks and an elastomeric disk. A first flange on a first gate disk mates to a second flange on a second gate disk forming an internal volume surrounding the elastomeric disk. An elastomeric sheath covers the mated disks with the first gate disk being radially offset from, and radially movable relative to, the second gate disk. A width of the gate disk assembly is less than a width between two valve seats when the gate disk assembly is in an open position. In a closed position, the first flange moves radially toward the second flange, compressing elastomeric disk, and causes the elastomeric disk to expand axially against the two gate disks, forcing them apart, and increasing the gate disk assembly width so that the gate disk assembly actively seals against the valve seats.

17 Claims, 7 Drawing Sheets

EXPANDING DISK GATE VALVE

BACKGROUND OF THE INVENTION

1. Field of the Invention

The invention pertains to the field of gate valves. More particularly, the invention pertains to expanding double disk gate valves.

2. Description of Related Art

Industrial valves provide accurate control of high-pressure fluid or gas flow. Gate valves are often used where fluid flow or gas flow is seldom interrupted, and accurate regulation of flow quantity is a prime consideration. Gate valves allow maximum flow while exercising flow control through the closure of a sliding gate transverse to the direction of flow in a flow channel.

The gate is user controlled through an operating stem such as a spindle screw or other types of operating stems and mechanisms. These operating stem mechanisms open and close the gate and also allow adjustments in flow rate by positioning the gate in intermediate positions in a flow channel. The primary advantage of a gate valve is that the nominal working flow rate of the fluid or gas is not reduced by installing the hollow valve body.

Various types of gate valve assemblies are known for opening and closing pipelines to control the flow of fluid or gas. The traditional gate valve employs a single metallic disk that is movable between an open position and a closed position transverse to a flow channel to stop or allow flow of a liquid or gas from an inlet through the gate valve and out through an outlet.

Single disk gates are typically mounted in valve bodies and seating channels with a small amount of play, so that pressure on an inlet side of the disk biases the gate toward a valve seat in the hollow valve body when the gate is in a closed position. This play may, however, allow leakage around the gate and the valve seat, and over time may result in wear that may require repair or replacement of the gate valve or the gate disk assembly.

Alternatively, single metal disks with close tolerances that more effectively seal flow when the gate is in a closed position can be subject to friction between the gate disk and the valve seat surfaces of the hollow valve body. Friction between the gate disk and the valve seat may hinder movement of the gate disk, and over time cause wear on the gate disk and/or valve seat that similarly degrades the sealing capacity of the valve seal and necessitates repair or replacement of the gate valve body or gate disk.

In the prior art, Kennedy (U.S. Pat. No. 4,483,514, "Gate Valve Member For Resilient-Seated Gate Valve") describes a valve gate disk assembly with two disks that reduces leakage and valve gate play. The two disks are positioned between two opposing valve seat surfaces in the hollow valve body. One disk is adjacent an inlet and the other disk is adjacent an outlet of a gate valve body. When closing the gate valve, the gate disk moves into the gate valve body, and the double disk construction sealingly engages the respective valve seat surfaces as the gate disk assembly moves into a fully closed position. The gate disks may be pressed outwards against the valve seats by a spring assembly, or by fluid pressure introduced between the gate disks.

Tiefenthaler (U.S. Pat. No. 4,913,400, "Double Disk Gate Valve", issued in 1990) describes a prior art double disk gate valve in which two disks are biased outwardly toward valve seat surfaces by fluid pressure. In this construction, a fluid medium is used to force the two gate disks apart through the use of pistons, cylinders, valves, and channels or piping that regulate the flow and pressure of the fluid between the two gate disks at open and closed positions.

Kennedy (U.S. Pat. No. 6,254,060, "Gate Assembly for a Double Disk Gate Valve", issued in 2001) describes another prior art dual disk gate valve in which an elastomeric material is positioned between two gate disks. In this construction, a cross member is included between the two gate disks, comprising a gate assembly attached to an operating stem, and in contact with the elastomeric material between the two gate disks. When the gate assembly is moved into a closed position, and when the gate disk assembly reaches a closed position pressing against the hollow valve body, the cross member is forced toward an opposing position of the hollow valve body. The cross member thus compresses the elastomeric material between the two gate disks, and this compressive force is translated outwardly against the two gate disks forcing them to positively seal against valve seats in the hollow valve body.

Gate valve assemblies employing double disk closure gates have been improved upon through the incorporation of elastomeric sealing material around the periphery of the gate disks. When the gate assembly is moved into a closed position in the hollow valve body, the elastomeric material located on the peripheral surfaces of the gate assembly are deformed at the valve seat surfaces through the application of pressure to the gate assembly, thereby helping to provide a tighter seal between the valve seat surfaces and the gate assembly than can be accomplished by bare metal disks alone.

Prior art configurations employing elastomeric sealing members around the periphery of a gate assembly must be constructed with narrow tolerances to ensure positive sealing characteristics. These tolerances must be even more precise when side wall portions of the valve seat surface perpendicular to the direction of gate travel are considered. The prior art typically mounts these elastomeric sealing members on the periphery of the gate assembly, making the dimensional tolerances of the elastomeric sealing member very narrow, to prevent compression of the elastomeric sealing member beyond its elastic limit. Maintaining narrow tolerances of elastomeric sealing members and valve seats requires significant manufacturing oversight, is time consuming, and is a cost factor limiting the application of double disk gate valves.

Further, in some prior art configurations, the pressure available for forcing gate disks outwardly against valve seating surfaces may be limited, delivered by complex structures, and/or unevenly applied about the circumference of the gate valve. These factors may negatively impact the reliability of these constructions, further increase costs, and may limit the diameter of flow channels in which they can be employed, as well as the maximum operating pressures of fluid flow they may effectively control.

For example, when an elastomeric material is located between two gate disks and compressed by a cross member, compression of the elastomeric material may not be uniformly distributed throughout the elastomeric material. Portions of the elastomeric material closest to the cross member may experience greater compression than portions of the elastomeric material that are farthest from the cross member. As a result, the outward pressure on the two gate disks may be greater near the cross member than at a location diametrically opposed to the cross member. This condition may limit the maximum diameter valve in which such a solution may be implemented.

SUMMARY OF THE INVENTION

An expanding disk gate valve of a construction described herein includes a valve assembly with two gate disks. A first gate disk has a flange extending perpendicularly from a back side of the first gate disk and encompassing slightly more than half the circumference of the first gate disk. A second gate disk similarly has a flange extending perpendicularly from a back side of the second gate disk and encompassing slightly more than half the circumference of the second gate disk. Each flange has two ends that are each mortised, with the mortises on one gate disk flange arranged to mate with the mortises on the other gate disk flange. Thus, when the two gate disks are assembled, a gate disk assembly is formed that defines a hollow internal volume, with the two disks being translatable from a coaxial relationship, to a slightly offset non-coaxial relationship in which one disk is radially offset from the other gate disk.

The hollow internal volume defined by the two gate disks is filled with a disk of an elastomeric material that fills the hollow internal volume when the two gate disks are slightly offset relative to each other in a non-coaxial relationship. The gate disk thus constructed may be covered in a sheath that is also formed of an elastomeric material, and completes the gate disk assembly. An operating stem may be coupled to the flange of one gate disk to control movement of the gate disk assembly.

When the gate disk assembly is in an "open" position, the first gate disk is slightly offset radially relative to the second gate disk, and the gate disk assembly has a minimum width between an inlet side and an outlet side of the gate disk assembly.

When the gate assembly is moved into a hollow valve body between two valve seats, the gate disk assembly is free to move with little friction, as the minimum width of the gate disk assembly is less than the distance between the two valve seats. When the gate disk assembly contacts a wall of the hollow valve body, opposite the operating stem coupled to the first gate disk, further motion of the second gate disk is prevented by the wall of the hollow valve body. The first gate disk, having been offset from the second gate disk, may continue to move with continued movement of the operating stem until the first gate disk comes into coaxial alignment with the second gate disk.

The elastomeric disk between the two gate disks is thereby compressed between the flange of the first gate disk and the flange of the second gate disk along a common radius of the two disks. Radial compression of the elastomeric disk translates into a lateral expansion of the elastomeric disk toward the back side of each of the two gate disks, and forces the two gate disks apart. This force is relatively uniform about the circumference of the gate disk assembly, and results in a positive engagement between the elastomeric sheath covering the gate disk assembly and the valve seats on either side of the gate disk assembly.

Pressure of the operating stem on the gate disk assembly also forces the gate disk assembly against a wall of the hollow valve body opposing the location of the operating stem, and also provides for positive engagement of the gate disk assembly against the hollow valve body between the two valve seats. These forces together provide a positively engaging seal about the circumference of the gate disk assembly.

DETAILED DESCRIPTION OF THE INVENTION

A double disk gate valve assembly of a construction described herein eliminates complex expansion mechanisms between two gate disks of a gate disk assembly, reduces material and manufacturing costs, improves reliability, reduces servicing costs and frequency, and may provide improved seal integrity about the circumference of the gate disk assembly over a larger range of gate valve diameters and flow pressures.

Figure 1A:
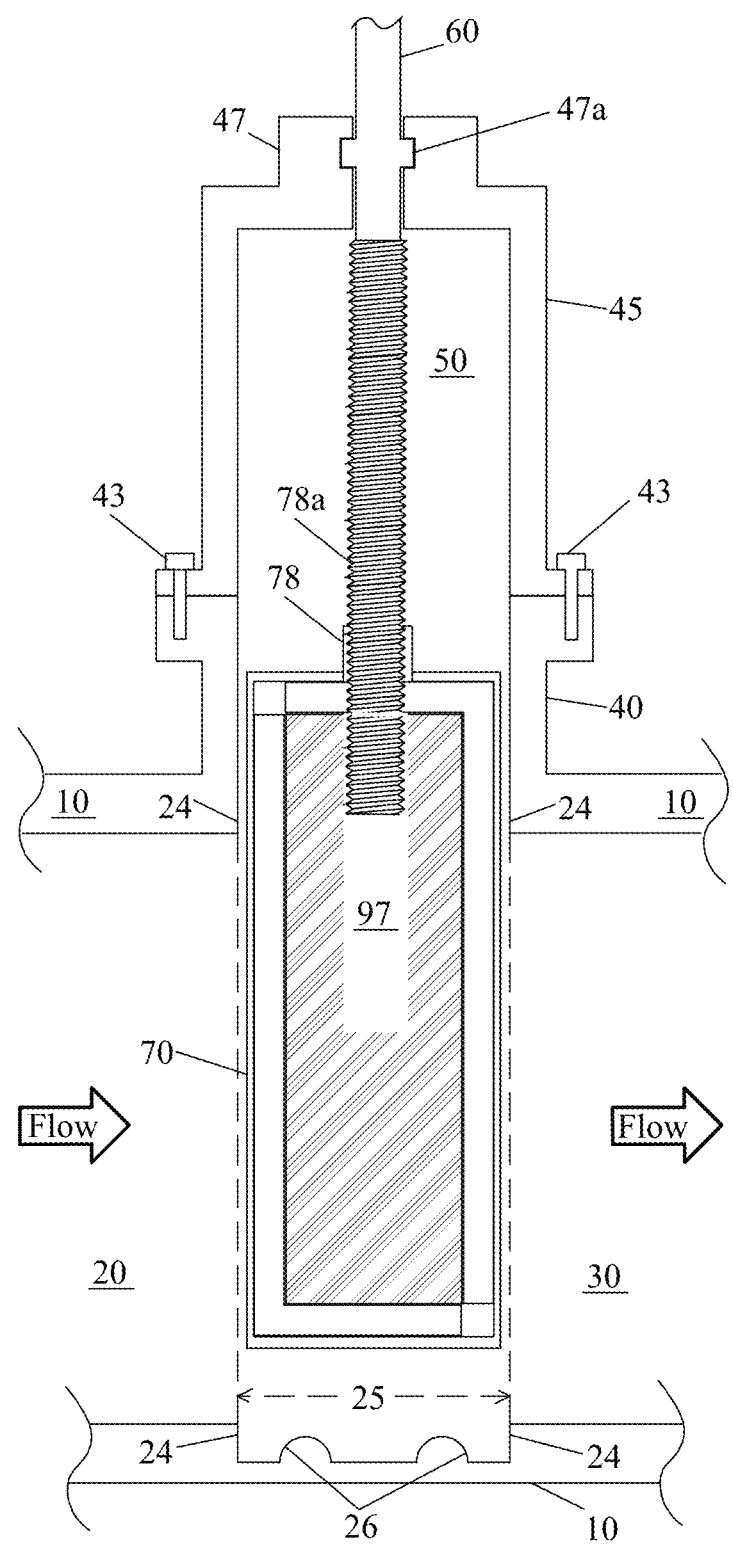
FIG. 1A shows a gate valve with an expandable dual disk gate in an interim position between a gate housing and a gate chamber in a non-rising operating stem configuration.
Figure 1B:
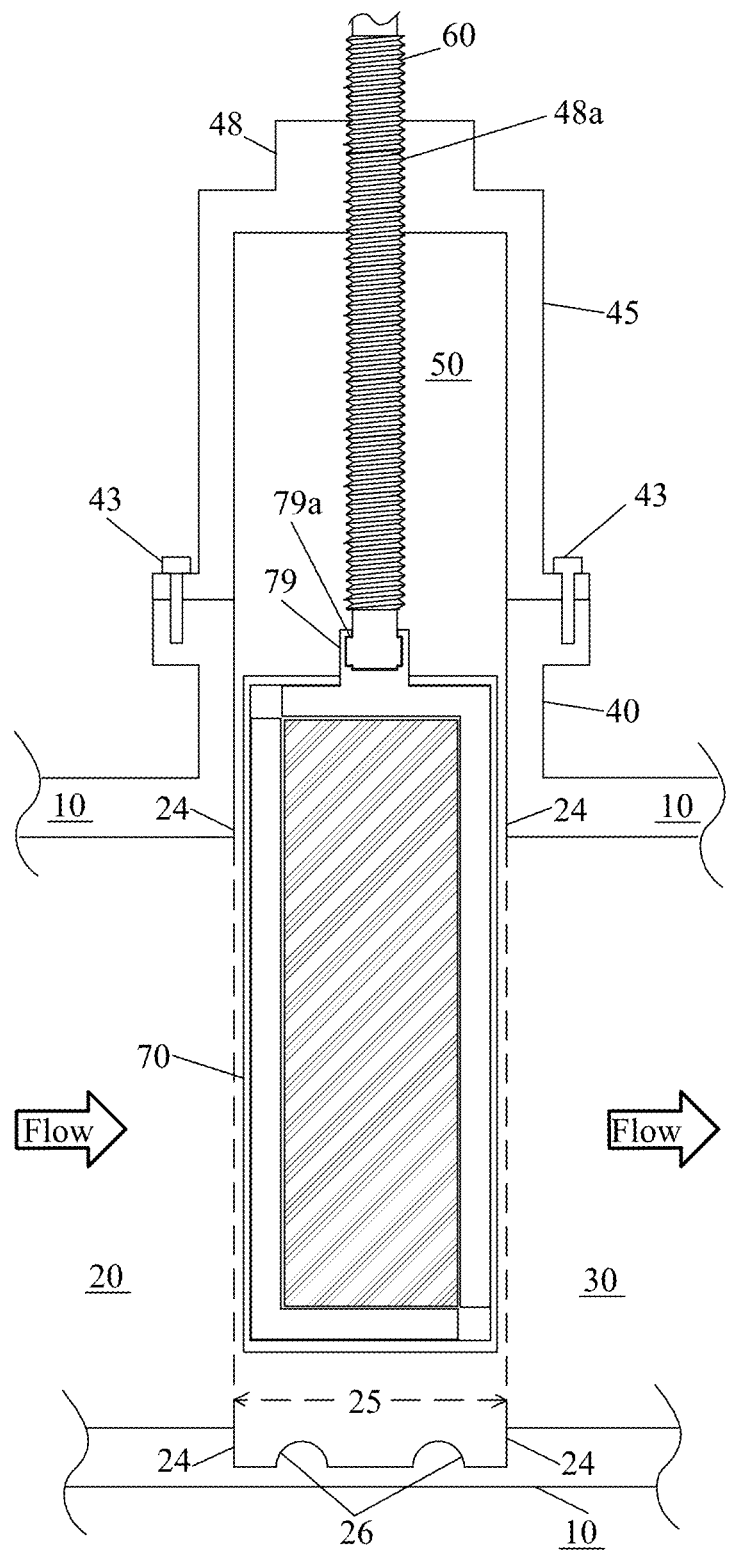
FIG. 1B shows a gate valve with an expandable dual disk gate in an interim position between a gate housing and a gate chamber in a rising operating stem configuration.

Referring to FIGS. 1A-1B, a hollow valve body 10 is mounted in a pipe by conventional connections, such as, for example, flanges, threads, solder joint, welding, or other connections known in the art (not shown in this figure). Fluid flows from an inlet 20, through a gate chamber 25, and out an outlet 30. The ends of the gate chamber 25 form valve seats 24 on the inlet 20 side and outlet 30 side of the gate chamber 25. For ease of assembly, the hollow valve body 10 may be formed in multiple parts, for example, being split into a first gate housing 40 and a second gate housing 45, together defining a gate receiving area 50 adjacent the gate chamber 25, and attached together by any means known in the art, for example by bolts 43 in these figures.

The gate chamber 25 is shown as a simple notch in an inner surface of the hollow valve body 10, and extends upwardly through the hollow valve body 10 into the first gate housing 40, where the first gate housing 40 also forms valve seats 24. However, the gate chamber 25 may have any cross sectional profile that is advantageous to manufacturing of the hollow valve body 10, and capable of forming valve seats 24 at the inlet 20 and outlet 30 sides of the gate chamber 25.

The gate chamber 25 also includes two surface features 26 that extend radially around a surface of the gate chamber 25 opposite the first gate housing 40 and inwardly toward the hollow valve body 10. These surface features 26 allow small debris, for example, sand, pebbles, razor muscles and other types of shells, to rest in the gate chamber 25 while the surface features 26 restrict further movement of the a gate disk assembly 70 into the gate chamber 25.

Figure 3:
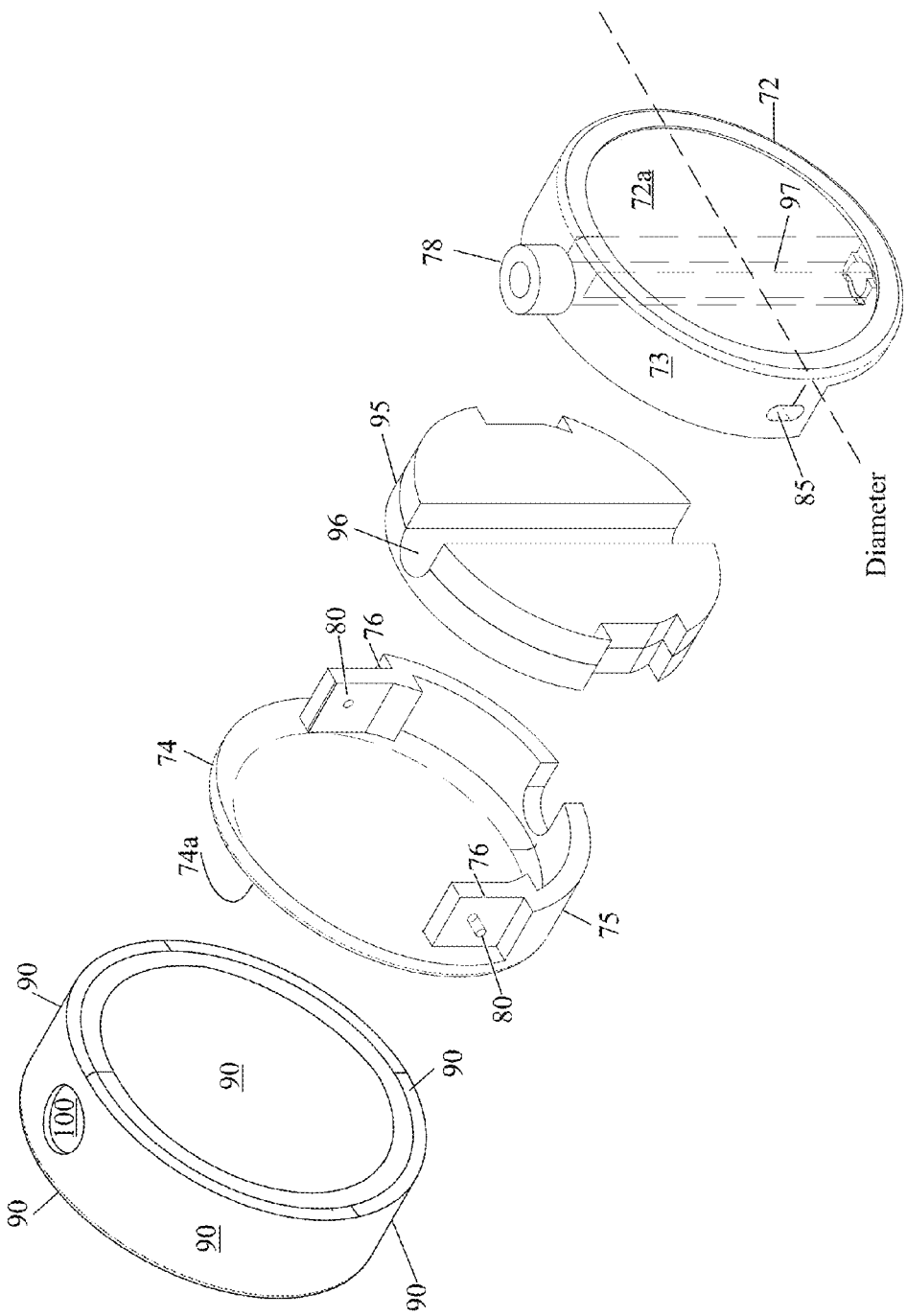
FIG. 3 shows an exploded view of an expanding dual disk gate disk assembly.
Figure 4:
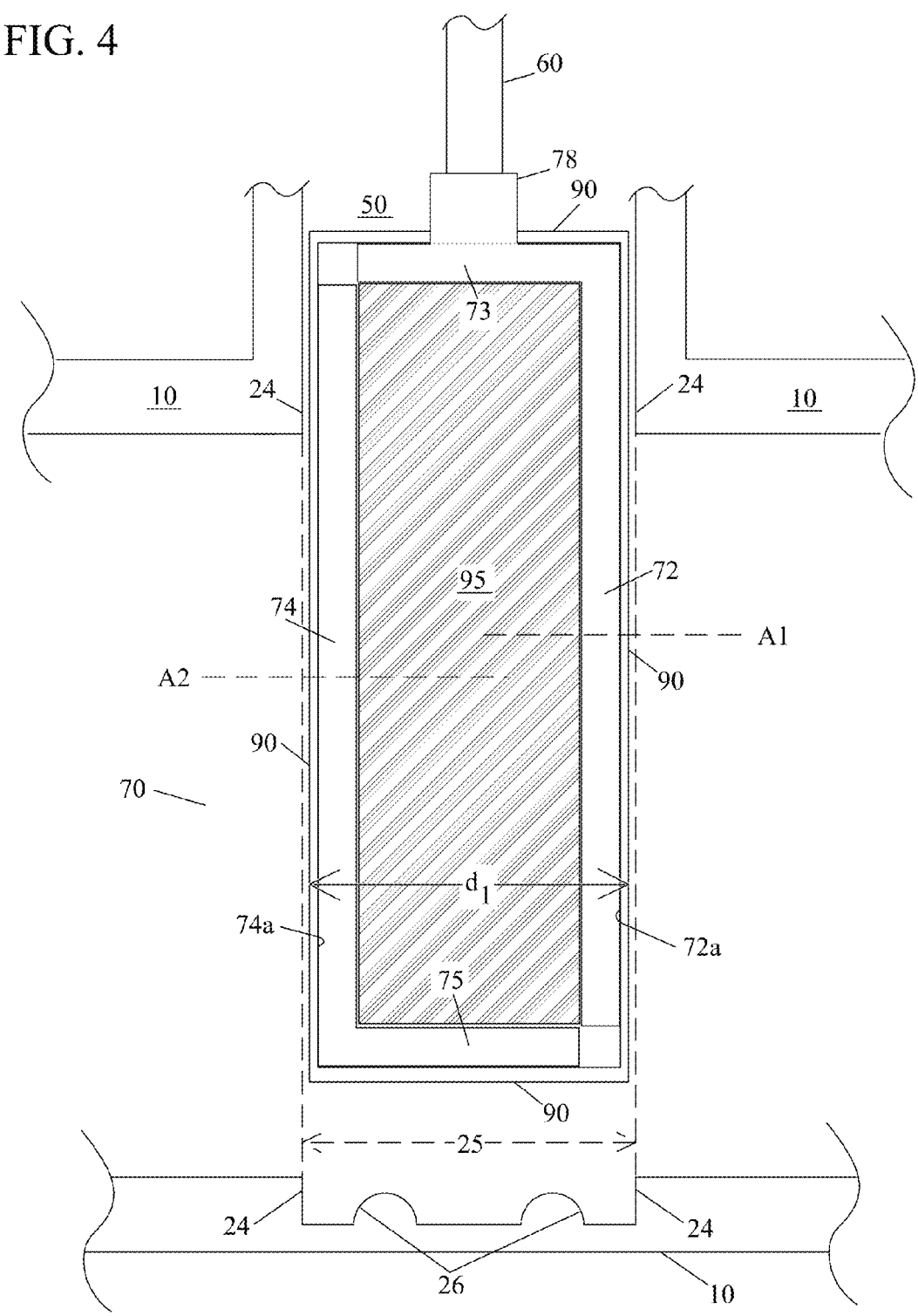
FIG. 4 shows an expanding dual disk gate disk assembly in an interim position between a gate housing and a gate chamber.
Figure 5:
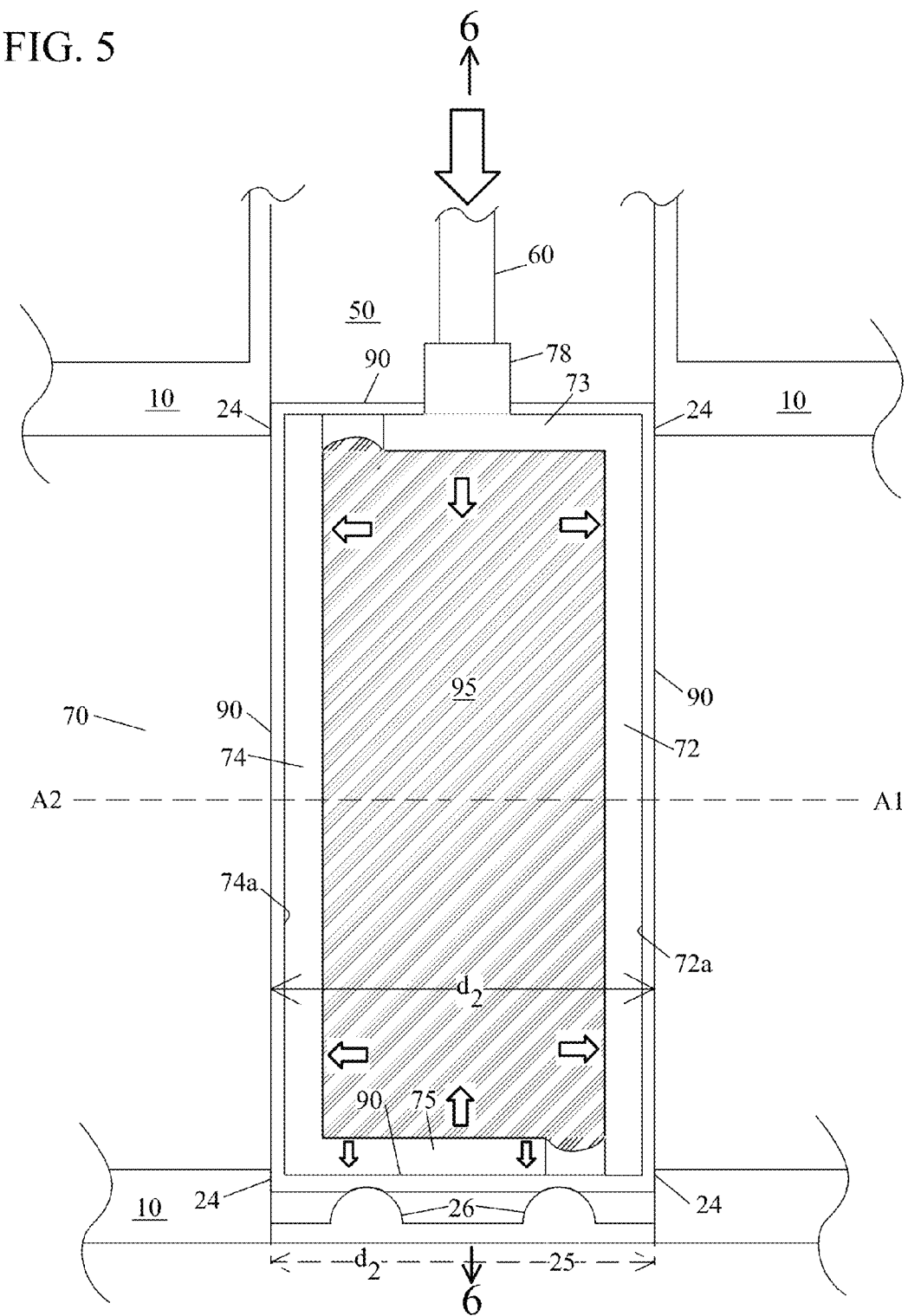
FIG. 5 shows an expanding dual disk gate disk assembly forced against a wall of a gate chamber and expanded laterally against valve seats by compression of an elastomeric material between two gate disks.

Thus, the effect of debris on restricting closure of the gate disk assembly 70 is reduced, and damage to elastic components, such as an elastomeric sheath 90 that is part of and surrounding the gate disk assembly, as shown in FIGS. 2-5, is also reduced. FIG. 5 illustrates the operational relationship between the surface features 26 of the gate chamber 25 and the elastomeric sheath 90 of the gate disk assembly 70 when the gate disk assembly 70 is in a closed position inside the hollow valve body 10 and gate chamber 25 against the surface features 26 of the gate chamber 25.

The gate disk assembly 70 is free to move between the gate receiving area 50 and the gate chamber 25 to regulate flow between the inlet 20 and the outlet 30 of the hollow valve body 10. An operating stem 60 is be coupled to the gate disk assembly 70 to move the gate disk assembly 70 between an open position in which the gate disk assembly 70 is within the gate receiving area 50, and a closed position in which the gate disk assembly 70 is within the gate chamber 25.

Any operating stem 60 arrangement of any type known in the art may be employed with the gate disk assembly 70. In one embodiment, an operating stem 60 having threads is used to move the gate disk assembly 70 laterally into and out of the gate chamber 25. In a non-rising stem configuration, shown in FIG. 1A, an operating stem coupling 78 between the operating stem 60 and the gate disk assembly 70 is of the stationary threaded type, with a threaded end 78a of the operating stem 60 passing through a threaded operating stem coupling 78 into and out of the gate disk assembly 70 when the operating stem 60 is rotated. In this embodiment, a gate housing coupling 47 may comprise a thrust bearing retainer and the operating stem 60 may comprise a thrust bearing 47a, for example, and allows free rotation of the operating stem 60 passing through the second gate housing 45, while holding the operating stem 60 at a fixed location along a length of the operating stem 60.

The gate disk assembly 70 thus translates along the operating stem 60 when the operating stem 60 is turned, and the threaded end 78a of the operating stem 60 moves into and out of the gate disk assembly 70. A seal or sealed bearing may be provided at the gate housing coupling 47 and thrust bearing 47a to prevent leakage around the operating stem 60 from the gate receiving area 50. A tube 97 is provided so that the operating stem 60 may move into and out of the gate disk assembly 70 as the gate disk assembly 70 moves along the operating stem 60.

Alternatively, as shown in FIG. 1B, a rising stem configuration may be used. In this figure, a threaded length 48a of the operating stem 60 passes through a threaded gate housing coupling 48, for example, a threaded stem nut. An end of the operating stem 60 may be rotatably coupled to the gate disk assembly 70 by an operating stem coupling 79 comprising a thrust bearing retainer receiving a thrust bearing 79a affixed to an end of the operating stem 60, or similar coupling. Thus, when the operating stem 60 is rotated, the operating stem 60 moves into and out of the gate receiving area 50, and also moves the gate disk assembly 70 accordingly. In other embodiments, the gate disk assembly 70 may be driven by a linear actuator, hydraulic mechanism, or other actuator capable of moving the gate disk assembly 70 between the gate chamber 25 and the gate receiving area 50.

Figure 2:
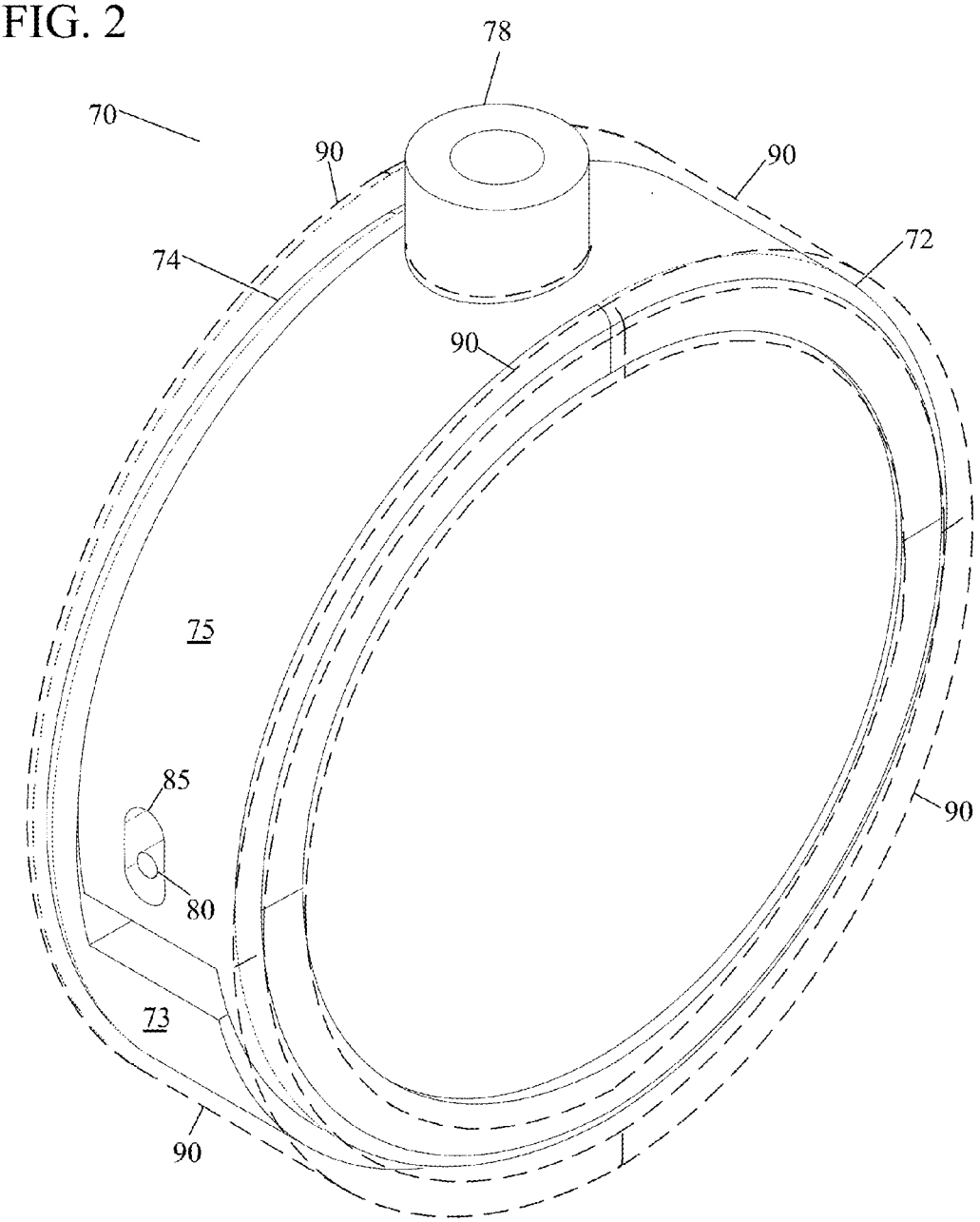
FIG. 2 shows a perspective of an expanding dual disk gate disk assembly.

Referring now to FIGS. 2-3, the gate disk assembly 70 is shown separated from the hollow valve body 10 and the operating stem 60. FIG. 2 shows the gate disk assembly 70 with a first gate disk 72 and second gate disk 74 in solid lines, and the elastic sheath 90 surrounding the first gate disk 72 and second gate disk 74 in dashed lines. FIG. 2 shows the elastic sheath 90, first gate disk 72, second gate disk 74, and an elastomeric disk 95 in an exploded view.

The gate disk assembly 70 includes a first gate disk 72 with a face 72a forming an outlet side of the gate disk assembly 70, and a second gate disk 74 with a face 74a forming an inlet side of the gate disk assembly 70.

The first gate disk 72 has a flange 73 extending perpendicularly from a back surface of the first gate disk 72. The flange 73 has an extent of more than one half of the circumference of the first gate disk 72. Similarly, the second gate disk 74 also has a flange 75 extending perpendicularly from a back surface of the second gate disk 74. The flange 75 also extends more than one half of the circumference of the second gate disk 74.

The ends of flange 73 are mortised (not visible in this view, see ref. 77 in FIG. 6) on an inner surface of flange 73, while the ends of flange 75 are mortised 76 on an outside of flange 75. As a result, when the first gate disk 72 and second gate disk 74 are assembled with flange 73 and flange 75 diametrically opposed, the mortise 76 and the mortise 77 overlap. In this orientation, the first gate disk 72 and the second gate disk 74 form a face 72a at an outlet side of the gate disk assembly 70, and a face 74a forming an inlet side of the gate disk assembly 70, and flange 73 of the first gate disk 72 and flange 75 of the second gate disk 74 together form the circumference of the gate disk assembly 70. The first gate disk 72 and the second gate disk 74, and flange 73 and flange 75, also define a hollow volume within the gate disk assembly 70.

The gate disk assembly 70 shown in FIG. 2 is presented in a resting, un-expanded state, as would be the case when the gate disk assembly 70 is in an open position. In this state, the first gate disk 72 and second gate disk 74 are not coaxial, with a central axis of the first gate disk 72 being radially offset slightly relative to a central axis of the second gate disk 74 along a diameter that is co-linear with the operating stem 60. The combination of the first gate disk 72 and second gate disk 74 in this state forms a gate disk assembly 70 that, together with an elastomeric sheath 90 covering the gate disk assembly 70 has a minimum nominal width.

The elastomeric sheath 90 may act to hold the first gate disk 72 and second gate disk 74 together as an assembly when the gate disk assembly 70 is in an open position. The elasticity of the elastomeric sheath 90 holds the face 72a of the first gate disk 72 and the face 74a of the second gate disk 74 toward each other when the gate disk assembly 70 is in the open position. Thus, the gate disk assembly 70, including the thickness of the elastomeric sheath 90, has a minimum nominal thickness and may move freely between the gate receiving area 50 and gate chamber 25 without binding or excessive frictional wear.

The elastomeric sheath 90 may also act as a resilient seal that deforms to the valve seats 24 in the hollow valve body 10 when the gate disk assembly 70 is in a fully closed and expanded position, improving the sealing of the valve seats 24. The elastomeric sheath 90 also includes an aperture 100 through which an operating stem coupling 78 passes.

Referring now to FIG. 3, in addition to the first gate disk 72, the second gate disk 74, and the elastomeric sheath 90, an elastomeric disk 95 is placed within the hollow volume defined between the first gate disk 72 and the second gate disk 74. The elastomeric disk 95, in an uncompressed state, holds the first gate disk 72 and second gate disk 74 in a radially offset, non-coaxial, alignment, as shown in FIG. 4, indicated by the dashed arrows, A1 and A2 representing a central axis of the first gate disk 72 and a central axis of the second gate disk 74, respectively.

Referring still to FIG. 3, the first gate disk 72 is shown with a tube 97 for receiving the operating stem 60 when an operating stem 60 of the non-rising type is employed, and the gate disk assembly 70 moves along a length of the operating stem 60. The tube 97, shown as a projection through the face 72a of the first gate disk 72 with dashed lines, or similar structure formed within the hollow volume between the first gate disk 72 and second gate disk 74, may act as a central spine against which compression of the elastomeric disk 95 may deflect radial compressive forces axially toward the face 72a and the face 74a of the first gate disk 72 and the second gate disk 74. In some embodiments, the tube 97 may be included regardless of the operating stem 60 configuration, and may be a surface feature on the inner side of one or both the first gate disk 72 and the second gate disk 74 that may favorably bias radial compression of the elastomeric disk 95 by the flange 73 and the flange 75 toward axial expansion of the elastomeric disk 95.

As shown in FIGS. 2-3, a pin 80 and groove 85 are included to limit maximum radial and axial movement of the first gate disk 72 relative to the second gate disk 74 and also improve structural integrity of the gate disk assembly 70. The pin 80 is shown extending radially from the mortise 76 of the flange 75 of the second gate disk 74, and the groove 85 is shown passing through the flange 73 of the first gate disk 72. It will be understood that the locations of the pin 80 and groove 85 may be reversed so that the groove 85 passes through the mortise 76 of the flange 75 of the second gate disk 74, and the pin 80 extends radially from the mortise (not shown in this view, see ref. 77 in FIG. 6) of the flange 73 of the first gate disk 72. Similarly, while the mortise 76 of the flange 75 of the second gate disk 74 is shown underlapping the mortise (not shown, see ref. 77 in FIG. 6) of the flange 73 of the first gate disk 72, these orientations may also be reversed so that the mortise 76 of the flange 75 overlaps the mortise of the flange 73.

The expansion and improved sealing capability of the gate disk assembly 70 is illustrated beginning with FIG. 4. The gate disk assembly 70 is shown within the hollow valve body 10. In this figure, the gate disk assembly 70 is shown in an interim position in the hollow valve body 10 in which there is no pressure applied to the first gate disk 72 by the operating stem 60, and the second gate disk 74 is not in contact with the side of the gate chamber 25 opposing the gate receiving area 50. The elastomeric disk 95 between the first gate disk 72 and the second gate disk 74 is in a non-compressed state and holds the face 72a and the face 74a of the first gate disk 72 and the second gate disk 74 apart. At the same time, the elastomeric sheath 90 holds the first gate disk 72 and the second gate disk 74 against the elastomeric disk 95. The gate disk assembly 70 has a minimum thickness $d_1$ in this open state. In the open state, the central axis A1 of the first gate disk 72 is also slightly offset radially relative to the central axis A2 of the second gate disk 74.

Referring now to FIG. 5, when the gate disk assembly 70 is moved to a closed position in the gate chamber 25 between the valve seats 24, the gate disk assembly 70 contacts the surface features 26 of the gate chamber 25 opposite the gate receiving area 50. Further movement of the second gate disk 74 is stopped, and the elastic sheath 90 is pressed against the surface features 26 of the gate chamber 25 by the flange 75 of second gate disk 74. The first gate disk 72, being offset radially from the second gate disk 74 in an open state, remains free to move into the gate chamber 25 under the pressure of the operating stem 60 through the coupling 78.

As the first gate disk 72 moves further into the gate chamber 25, the central axis A1 of the first gate disk 72 comes into coaxial alignment with the central axis A2 of the second gate disk 74. The elastomeric disk 95 is compressed radially inwardly by the flange 73 of the first gate disk 72 in one direction, and radially inwardly by the flange 75 of the second gate disk 74 in an opposing direction. As the elastomeric disk 95 deforms in compression between the flange 73 and the flange 75, the elastomeric disk 95 translates inward radial pressure from the flange 73 and the flange 75 into axial pressure, expanding against the first gate disk 72 and the second gate disk 74. Thus, the first gate disk 72 and the second gate disk 74 are forced away from each other, and are separated so that the gate disk assembly 70 increases in width, from $d_1$ to $d_2$.

The elastomeric sheath 90 deforms to allow expansion of the gate disk assembly 70, and is also forced against the valve seats 24 about the circumference of the gate disk assembly 70 and the circumference of the valve seats 24. Seal integrity is therefore provided by the pressure of the gate disk assembly 70 expanding longitudinally against the valve seats 24 about the circumference of the gate disk assembly 70, as well as the force of the gate disk assembly 70 being pressed into the gate chamber 25 by the operating stem 60. These forces cause the elastomeric sheath 90 to conform to sides of the gate chamber 25 and the valve seats 24, and form a positive seal with the valve seats 24 and the gate chamber 25.

Figure 6:
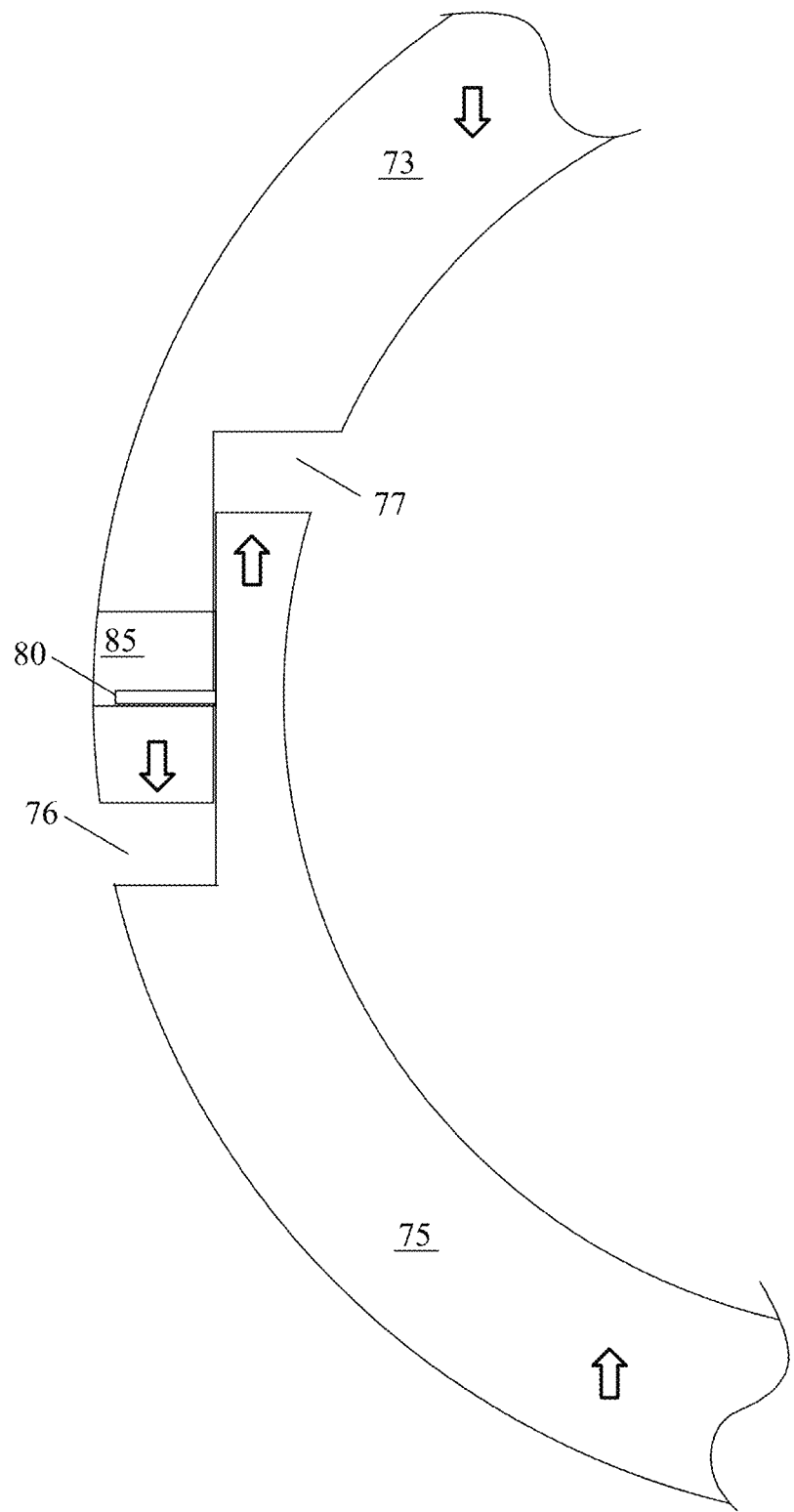
FIG. 6 shows a cross-section of overlapping mortises on flanges of two gate disks allowing radial motion of one gate disk relative to the other gate disk.

FIG. 6 illustrates the mortise 76 on the flange 75 of the second gate disk 74 and the mortise 77 on the flange 73 of the first gate disk 72. This figure is a cross-section of the gate disk assembly 70 through a plane between the face 72a and the face 74a of the first gate disk 72 and second gate disk 74, and through the groove 85 and the pin 80. The gate disk assembly 70 is shown in an open state where the first gate disk 72 is offset radially from the second gate disk 74. As shown by the arrows in this figure, when pressure is applied to the flange 73 of first gate disk 72 in a first direction, and pressure is also applied to the flange 75 of the second gate disk 74 in an opposing direction, the extent of the mortise 76 and the mortise 77 and the overlap between the flange 73 and the flange 75 created by the mortise 76 and the mortise 77, allows the first gate disk 72 and the second gate disk 74 to move radially relative to each other.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A gate disk assembly for a gate valve having a gate chamber with an inlet valve seat and an outlet valve seat, the gate disk assembly comprising:
   i) a first gate disk having a central axis, a face, a back surface, a perimeter, and a first flange extending axially from the back surface of the first gate disk along at least half of the perimeter of the first gate disk;
   ii) a second gate disk having a central axis, a face, a back surface, a perimeter, and a second flange extending axially from the back surface of the second gate disk along at least half of the perimeter of the second gate disk, the first flange and the second flange being sized and located such that when the first gate disk is assembled coaxially with the second gate disk, ends of the first flange and ends of the second flange overlap to define a hollow volume bounded by the back surface of the first gate disk, the back surface of the second gate disk, an inner surface of the first flange, and an inner surface of the second flange;
   iii) an elastomeric disk filling the hollow volume and holding the central axis of the first disk radially offset from the central axis of the second disk when the elastomeric disk is in an uncompressed state;
   iv) an operating stem coupling attached to the first flange for movement of the first flange; and
   v) an elastomeric sheath enclosing the first gate disk, the second gate disk and the elastomeric disk;
   such that operation of the operating stem moves the gate disk assembly against a side of the gate chamber, the elastomeric disk is compressed between the first flange and the second flange, causing a width of the gate disk assembly to increase to seal against the inlet valve seat and the outlet valve seat.

2. The gate disk assembly of claim 1, in which the operating stem coupling of the first gate disk is a stationary threaded nut for coupling with a threaded end of an operating stem.

3. The gate disk assembly of claim 1, wherein the operating stem coupling of the first gate disk is a thrust bearing retainer for coupling with a thrust bearing on an operating stem.

4. The gate disk assembly of claim 1, further comprising a tube within the elastomeric disk for receiving an operating stem.

5. The gate disk assembly of claim 1, further comprising a surface feature on the back surface of the first gate disk for biasing radial compression of the elastomeric disk toward axial expansion of the elastomeric disk.

6. The gate disk assembly of claim 1, further comprising a surface feature on the back surface of the second gate disk for biasing radial compression of the elastomeric disk toward axial expansion of the elastomeric disk.

7. The gate disk assembly of claim 1, in which the ends of the first flange and the ends of the second flange comprise mortises.

8. The gate disk assembly of claim 7, further comprising a pin coupling the mortises on the ends of the first flange and the second flange.

9. An expanding disk gate valve comprising:
   a) a hollow valve body having an inlet, an outlet, and a gate chamber located between the inlet and the outlet, the gate chamber having an inlet valve seat, an outlet valve seat, and a gate chamber width between the inlet valve seat and the outlet valve seat;
   b) a gate housing defining a gate receiving area with an opening to the gate chamber and having an operating stem coupling;
   c) an operating stem passing through the gate housing, and having a gate housing coupling and a gate disk assembly coupling; and
   d) a gate disk assembly comprising:
      i) a first gate disk having a central axis, a face, a back surface, a perimeter, and a first flange extending axially from the back surface of the first gate disk along at least half of the perimeter of the first gate disk;
      ii) a second gate disk having a central axis, a face, a back surface, a perimeter, and a second flange extending axially from the back surface of the second gate disk along at least half of the perimeter of the second gate disk, the first flange and the second flange being sized and located such that when the first gate disk is assembled coaxially with the second gate disk, ends of the first flange and ends of the second flange overlap to define a hollow volume bounded by the back surface of the first gate disk, the back surface of the second gate disk, an inner surface of the first flange, and an inner surface of the second flange;
      iii) an elastomeric disk filling the hollow volume and holding the central axis of the first disk radially offset from the central axis of the second disk when the elastomeric disk is in an uncompressed state;
      iv) an operating stem coupling attached to the first flange for movement of the first flange; and
      v) an elastomeric sheath enclosing the first gate disk, the second gate disk and the elastomeric disk;
   such that operation of the operating stem moves the gate disk assembly against a side of the gate chamber, the elastomeric disk is compressed between the first flange and the second flange, causing a width of the gate disk assembly to increase to seal against the inlet valve seat and the outlet valve seat.

10. The expanding disk gate valve of claim 9, wherein the operating stem coupling of the gate housing comprises a thrust bearing retainer, the gate housing coupling of the operating stem comprises a thrust bearing, the operating stem coupling of the first gate disk is a stationary threaded nut, and the gate disk assembly coupling of the operating stem is a threaded end of the operating stem.

11. The expanding disk gate valve of claim 9, wherein the operating stem coupling of the gate housing comprises a stationary threaded nut, the gate housing coupling of the operating stem comprises a threaded length of the operating stem, the operating stem coupling of the first gate disk is a thrust bearing retainer, and the gate disk assembly coupling of the operating stem is a thrust bearing.

12. The expanding disk gate valve of claim 9, further comprising a tube within the elastomeric disk for receiving the operating stem.

13. The expanding disk gate valve of claim 9, further comprising a surface feature on the back surface of the first gate disk for biasing radial compression of the elastomeric disk toward axial expansion of the elastomeric disk.

14. The expanding disk gate valve of claim 9, further comprising a surface feature on the back surface of the second gate disk for biasing radial compression of the elastomeric disk toward axial expansion of the elastomeric disk.

15. The expanding disk gate valve of claim 9, in which the ends of the first flange and the ends of the second flange comprise mortises.

16. The expanding disk gate valve of claim 15, further comprising a pin coupling the mortises on the ends of the first flange and the second flange.

17. The expanding disk gate valve of claim 9, wherein the gate chamber of the hollow valve body further comprises a surface between the inlet valve seat of the gate chamber and the outlet valve seat of the gate chamber, the surface having surface features on at least a portion of the surface to stop movement of the gate disk assembly into the gate chamber.

* * * * *